(12) United States Patent
Lee et al.

(10) Patent No.: US 9,522,511 B2
(45) Date of Patent: Dec. 20, 2016

(54) CUT-OUT LAMINATED SHEET AND PREPARATION METHOD THEREOF

(71) Applicant: SKC CO., LTD., Suwon-si, Gyeonggi-do (KR)

(72) Inventors: Dong Gyu Lee, Suwon-si (KR); Jin Cheol Kim, Hwaseong-si (KR); Pyung Soo Ha, Seoul (KR); Il Hwan Yoo, Seongnam-si (KR); Dongjin Park, Cheongju-si (KR); Tae Kyoung Kim, Seoul (KR)

(73) Assignee: SKC CO., LTD, Suwon-si (KR)

( * ) Notice: Subject to any disclaimer, the term of this patent is extended or adjusted under 35 U.S.C. 154(b) by 0 days.

(21) Appl. No.: 14/199,289

(22) Filed: Mar. 6, 2014

(65) Prior Publication Data

US 2015/0017395 A1    Jan. 15, 2015

(30) Foreign Application Priority Data

Jul. 4, 2013    (KR) ........................ 10-2013-0078593
Dec. 30, 2013   (KR) ........................ 10-2013-0166957

(51) Int. Cl.
*B32B 3/02*  (2006.01)
*B32B 38/10* (2006.01)
(Continued)

(52) U.S. Cl.
CPC .................. *B32B 3/02* (2013.01); *B26D 3/065* (2013.01); *B26F 1/40* (2013.01); *B32B 7/06* (2013.01); *B32B 9/005* (2013.01); *B32B 9/045* (2013.01); *B32B 15/08* (2013.01); *B32B 25/08* (2013.01); *B32B 27/283* (2013.01); *B32B 27/308* (2013.01); *B32B 43/003* (2013.01);
(Continued)

(58) Field of Classification Search
CPC ............. Y10T 156/10; Y10T 156/1052; Y10T 156/1082; B29C 2793/0054; B26F 1/02; B26F 1/04; B26F 1/14; B26F 1/40; B26F 2001/2449; B26F 2210/02; B26F 2001/407; B26F 2001/4472; B32B 3/02; B32B 38/10; B32B 43/003; B26C 2791/001; B26C 2793/0027
USPC ...................................................... 156/247
See application file for complete search history.

(56) References Cited

U.S. PATENT DOCUMENTS

2006/0027315 A1*  2/2006  Merino Rojo ........ B29C 43/203
                                                  156/247

FOREIGN PATENT DOCUMENTS

CN    202617204       2/2012
CN    202878851 U     4/2013
(Continued)

OTHER PUBLICATIONS

Korean Intellectual Property Office, Communication dated Aug. 22, 2014, issued in corresponding Korean Application No. 10-2013-0166957.
(Continued)

*Primary Examiner* — Linda L Gray
(74) *Attorney, Agent, or Firm* — Sughrue Mion, PLLC (57) ABSTRACT

A cut-out laminated sheet can be prepared by laminating a protection sheet on a base sheet, followed by a simple two-step shearing process. The cut-out laminated sheet thus prepared features a protruding section that helps improving productivity by making the removal of the protection sheet easy; and thus, can be effectively used in a wide range of industrial applications such as a brittle sheet and a flexible sheet.

8 Claims, 4 Drawing Sheets

(51) Int. Cl.
  *B26F 1/40*    (2006.01)
  *B32B 15/08*   (2006.01)
  *B32B 43/00*   (2006.01)
  *B26D 3/06*    (2006.01)
  *B32B 7/06*    (2006.01)
  *B32B 9/00*    (2006.01)
  *B32B 9/04*    (2006.01)
  *B32B 25/08*   (2006.01)
  *B32B 27/28*   (2006.01)
  *B32B 27/30*   (2006.01)
  *B26F 1/02*    (2006.01)
  *B26F 1/44*    (2006.01)

(52) U.S. Cl.
  CPC ........... *B26F 1/02* (2013.01); *B26F 2001/449* (2013.01); *B32B 38/10* (2013.01); *B32B 2307/546* (2013.01); *Y10T 156/1052* (2015.01); *Y10T 156/1082* (2015.01); *Y10T 428/24777* (2015.01)

(56) References Cited

FOREIGN PATENT DOCUMENTS

| | | |
|---|---|---|
| JP | 60-8000 U | 1/1985 |
| JP | 62-131426 U | 8/1987 |
| JP | 2008147470 A | 6/2008 |
| JP | 2012-4180 A | 1/2012 |
| KR | 1020060101785 A | 9/2006 |
| KR | 10-1198919 B1 | 11/2012 |

OTHER PUBLICATIONS

Japanese Patent Office, Communication dated Jun. 2, 2015 issued in counterpart application No. 2014-069444.

Japanese Patent Office, Communication dated Dec. 1, 2015 issued in counterpart application No. 2014-069444.

State Intellectual Property of People'S Republic of China, Communication dated Dec. 17, 2015 in counterpart application No. 201410120750.2.

* cited by examiner

CUT-OUT LAMINATED SHEET AND PREPARATION METHOD THEREOF

CROSS REFERENCE TO RELATED APPLICATIONS

This application claims priorities based on Korean Patent Application Nos. 10-2013-0078593 filed Jul. 4, 2013 and 10-2013-0166957 filed Dec. 30, 2013, the contents of all of which are incorporated herein by reference in their entirety.

FIELD OF THE INVENTION

The present invention relates to a cut-out laminated sheet prepared by shearing a laminated sheet having a base sheet and a protection sheet disposed on the base sheet, and a method for preparing same. Also, the present invention relates to a cut-out sheet from which a protection sheet is removed.

BACKGROUND OF THE INVENTION

In order to prepare a functional base sheet in a specific shape that is applicable for electronic components and the like, protection sheets are laminated on both sides of a base sheet. The laminated sheet is then subjected to a shearing process in the prior art such as KR Patent Publication No. 10-1198919.

Such conventional protection sheets are generally removed before the base sheet is applied onto a final product; however, it is not easy to remove the protection sheets that have been subjected to a shearing process, because both the laminated protection sheets and the base sheet are in an identical shape. Also, in case when a brittle sheet such as ceramic sheet is employed, the properties thereof may be deteriorated due to cracks that may be formed in the base sheet during the removal of the protection sheets. Further, the overall productivity may be impaired due to the time-consuming removal of the protection sheets.

SUMMARY OF THE INVENTION

Accordingly, it is an object of the present invention to provide a cut-out laminated sheet from which a protection sheet is easily detachable.

It is another object of the present invention to provide a method for preparing same in an efficient manner.

It is a further object of the present invention to provide a cut-out sheet from which a protection sheet is removed.

In accordance with one aspect of the present invention, there is provided a method for manufacturing a cut-out laminated sheet, comprising the steps of: (a) preparing a laminated sheet comprising a base sheet and a first protection sheet disposed on one side of the base sheet; (b) subjecting the laminated sheet to a first shearing step to obtain a laminated sheet with a protruding section at its side edge; and (c) subjecting the laminated sheet thus obtained to a second shearing step to remove the base sheet component in the protruding section of the laminated sheet so as to leave only the first protection sheet component in the protruding section of the laminated sheet.

In accordance with another aspect of the present invention, there is provided a cut-out laminated sheet comprising a base sheet and a first protection sheet, which is disposed on one side of the base sheet, wherein the first protection sheet fully covers the one side of the base sheet and has a protruding section at its side edge, which extends outwardly beyond the side edge of the base sheet.

In accordance with a further aspect of the present invention, there is provided a cut-out sheet prepared by a shearing process, comprising a first cut edge as a result of a first shearing step and a second cut edge as a result of a second shearing step.

The cut-out laminated sheet in accordance with the present invention can be prepared in simple two shearing steps and has a protruding section that allows easy removal of the protection sheet; thus, it can be effectively used in a wide range of industrial applications, e.g., brittle sheets and flexible sheets.

BRIEF DESCRIPTION OF DRAWINGS

The above and other objects, features and other advantages of the present invention will be more clearly understood from the following detailed description taken in conjunction with the accompanying drawings, in which:

FIG. 1(a)-1(c) are a schematic cross-sectional views showing the manufacturing process of the inventive cut-out laminated sheet by using a combined-type shearing device set according to one example of the present invention.

FIG. 2(a)-2(d) are a schematic cross-sectional views showing the manufacturing process of the inventive cut-out laminated sheet by using a separate-type shearing device set according to another example of the present invention.

DRAWING SYMBOLS

10: (Cut-out) laminated sheet, 11: (Cut-out) laminated sheet body,
12: Protruding section of a (cut-out) laminated sheet,
15: Interface between the body and the protruding section,
100: Base sheet, 101: Base sheet body (cut-out sheet),
102: Protruding section of a base sheet, 107: First cut edge,
108: Border between first and second cut edges,
109: Second cut edge, 210: First protection sheet,
211: First protection sheet body,
212: Protruding section of a first protection sheet,
220: Second protection sheet, 221: Second protection sheet body,
222: Protruding section of a second protection sheet,
225: Fragments of a second protection sheet,
300: Combined-type shearing device set
311: First pressing module 312: First supporting module
321: Second pressing module 322: Second supporting module
400: First shearing device 500: Second shearing device
411, 511: Pressing modules 412, 512: Supporting modules
351, 451, 551: Upper dies 352, 452, 552: Lower dies
d, d': Clearance

DETAILED DESCRIPTION OF THE INVENTION

Hereinafter, the present invention will be described in detail.

As used herein, the term "base sheet" refers to a flat sheet in general, and its shape, material and the like are not specifically limited.

The base sheet may be a brittle sheet of, e.g., a metal, a metal alloy, a metal oxide, a ceramic, a plastic or a composite material thereof.

The base sheet may be a flexible sheet of, e.g., a natural polymer resin, a synthetic polymer resin, a rubber, or a composite material thereof.

The base sheet may be a functional sheet to perform a specific function.

In one embodiment, the base sheet may be a magnetic sheet containing a magnetic component for absorbing/shielding an electromagnetic wave. Examples of the magnetic component may include a magnetic oxide such as a ferrite (e.g., NiZn-, MgZn- or MnZn-based ferrite), a magnetic metal such as permalloy and sendust, or a composite material thereof.

Examples of the magnetic sheet include (i) a sintered magnetic sheet prepared by sintering the magnetic component at high temperatures, (ii) a polymeric magnetic sheet prepared by adding the magnetic component in the form of powder to a polymer resin and then casting it into a sheet, (iii) a composite magnetic sheet prepared by forming a magnetic layer on a polymer film using the magnetic component via deposition, coating, aerosol deposition and the like.

As used herein, the terms "first protection sheet" and "second protection sheet" refer to sheets disposed on the outer surfaces of a base sheet, and their shape, material and the like are not specifically limited.

In one embodiment, the first and/or second protection sheet may be a flexible sheet. The flexible sheet may be, for example, a polymer film; and more particularly, a polymer film based on polyesters, polyolefins, polyvinylchlorides, polycarbonates or a mixture thereof.

An adhesive layer may be formed on one or both sides of the first and/or second protection sheet. For example, the adhesive layer may be an acrylic- or silicon-based adhesive layer.

In the description of embodiments, it will be understood that when a sheet, film and the like is referred to as being 'on' or 'under' another sheet, film and the like, the terminology includes both the meanings of 'directly' and 'indirectly.' Further, the sizes of the elements and the relative sizes between elements may be exaggerated for better understanding of the present invention, and the size of each element does not entirely reflect an actual size.

Preparation of Cut-Out Laminated Sheet

The method for manufacturing a cut-out laminated sheet of the present invention comprises the steps of (a) preparing a laminated sheet comprising a base sheet and a first protection sheet disposed on one side of the base sheet; (b) subjecting the laminated sheet to a first shearing step to obtain a laminated sheet with a protruding section at its side edge; and (c) subjecting the laminated sheet thus obtained to a second shearing step to remove the base sheet component in the protruding section of the laminated sheet so as to leave only the first protection sheet component in the protruding section of the laminated sheet.

In step (a) of the inventive method, a second protection sheet may be disposed on the other side of the base sheet. In such event, the second protection sheet component in the protruding section of the laminated sheet may also be removed in step (c) as a result of the second shearing step.

(a) Preparation of Laminated Sheet

A laminated sheet with a first protection sheet disposed on one side of a base sheet is prepared in this step.

In this step, a second protection sheet may also be disposed on the other side of the base sheet.

In this step, the lamination step of the base sheet and the first protection sheet (and, optionally, the second protection sheet) is(are) not specifically limited.

In one embodiment, the first protection sheet (and, optionally, the second protection sheet) may be placed on one or both sides of the based sheet, and a conventional method known in the art, e.g., lamination by using pressure rollers, etc., may be used. During this step, an acrylic- or silicone-based adhesive layer may be formed on the first protection sheet (and, optionally, the second protection sheet) so as to improve the adhesiveness of the protection sheet(s) to the base sheet.

In another embodiment, this step may be conducted by spreading or depositing raw materials of the first protection sheet (and, optionally, the second protection sheet) on to the base sheet. For example, in case where the first protection sheet (and, optionally, the second protection sheet) is(are) a polymer sheet, raw materials of the polymer may be coated on one or both sides of the base sheet, which is then dried.

(b) Preparation of Cut-Out Laminated Sheet by Shearing Steps

The laminated sheet prepared in the previous step is subjected to a first shearing step and a second shearing step to obtain a cut-out laminated sheet.

The first and second shearing steps may be conducted by using a combined-type shearing device set or a separate-type shearing device set.

(b-1) First Shearing Step

In this step, the laminated sheet prepared in the previous step is subjected to a shearing step to obtain a laminated sheet with a protruding section at its side edge.

For example, the first shearing step may be conducted by a blanking process which comprises applying shear forces to the laminated sheet by using a pressing module having a desired shape with a protruding section at its side edge.

Once the laminated sheet undergoes the first shearing step, the base sheet and the first protection sheet (and, optionally, the second protection sheet) have an identical shape and size of protruding section at their side edges.

At this point, the protruding section of the laminated sheet may have a square, rectangular, triangular, circular or elliptical shape, which extends outwardly from the side edge of the laminated sheet.

In case, as shown in FIG. 3(a), where the first protection sheet 210 is disposed on one side of the base sheet 100 and the second protection sheet 220 is disposed on the opposite side of the base sheet 100, all the three sheets have an identical shape and size of a protruding section at their side edges.

(b-2) Second Shearing Step

In this step, the base sheet component in the protruding section of the laminated sheet is removed from the laminated sheet having the protruding section at its side edge as obtained in the previous first shearing step, so as to leave only the protection sheet component in the protruding section of the laminated sheet.

Specifically, in the second shearing step, shear forces acting in opposite directions to each other with a clearance are applied in the direction normal to the surface of the laminated sheet to the interface between the body and the protruding section 15 of the laminated sheet prepared in the previous first shearing step to cut and remove the base sheet component 102 in the protruding section of the laminated sheet, thereby leaving only the first protection sheet component 212 in the protruding section of the laminated sheet.

More specifically, shear forces are applied in the direction normal to the surface of the laminated sheet to the interface between the body and the protruding section 15 by pressing a pressing module having a shape conforming to the protruding section in the direction normal to the surface of the protruding section, while the body of the laminated sheet prepared in the previous first shearing step, except the protruding section, is fixed.

If a second protection sheet is laminated in the previous step (a), the second protection sheet component is also removed from the protruding section in the second shearing step.

In this case, specifically, shear forces acting in opposite directions to each other with a clearance are applied in the direction normal to the surface of the laminated sheet to the interface between the body and the protruding section 15 of the laminated sheet prepared in the previous first shearing step to cut and remove both the protruding section of the base sheet 102 and the protruding section of the second protection sheet 222, thereby leaving only the first protection sheet component 212 in the protruding section of the laminated sheet.

In this step, the clearance between the shear forces applied in the direction normal to the surface of the laminated sheet may be greater than one half of the thickness of the protection sheet and smaller than the sum of the thicknesses of the protection sheet and of the base sheet.

In the case where the first protection sheet is flexible, the protruding section of the first protection sheet 212 would not be cut, rather momentarily bent, when said shear forces are applied to the interface between the body and the protruding section of the laminated sheet.

Once the laminated sheet undergoes the second shearing step, only the first protection sheet would maintain the protruding section at its side edge, whereas the base sheet (and, optionally, the second protection sheet) lacks the protruding section the protruding section at its side edge.

Figure 3:
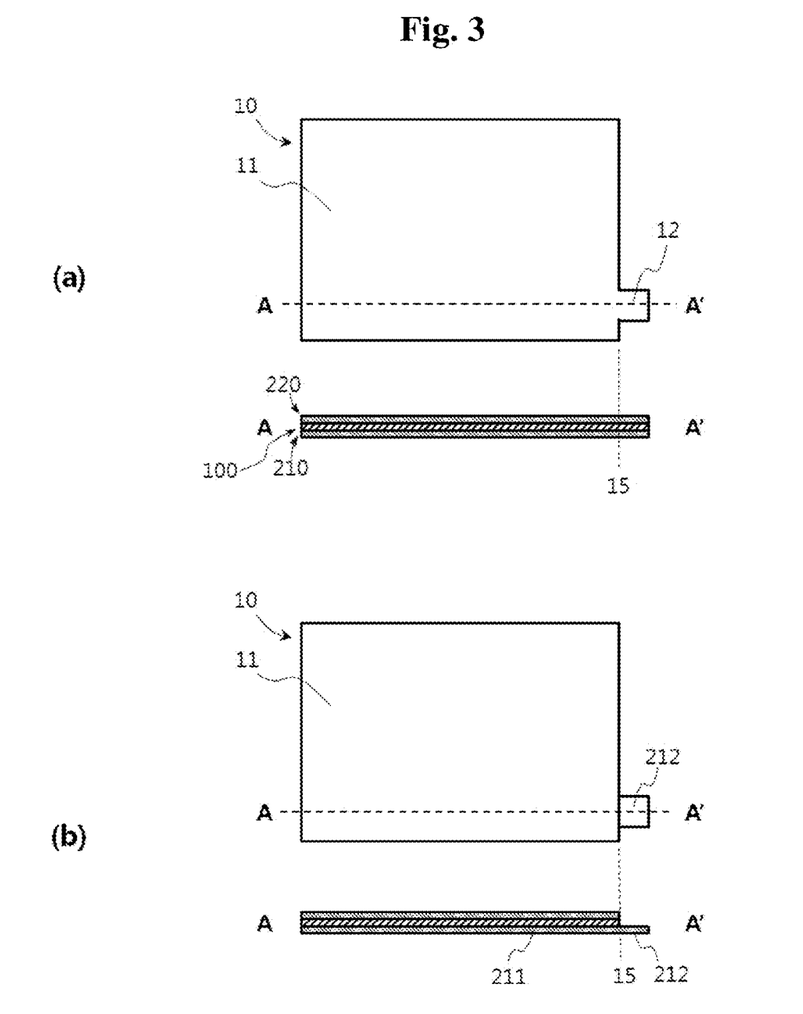
FIG. 3(a)-3(b) show plain views and cross-sectional views of (a) a laminated sheet after the first shearing step, and (b) a laminated sheet after the second shearing step in an embodiment.

In the case where the first and second protection sheets 210, 220 are respectively disposed on each side of the base sheet 100, as shown in FIG. 3(*b*), only the first protection sheet 210 maintains the protruding section at its side edge after the second shearing step, whereas the second protection sheet 220 and the base sheet 100 lack the protruding section at their side edges.

Example

Preparation of Cut-Out Laminated Sheet by Using a Combined-Type Shearing Device Set The first and second shearing steps may be conducted in the same shearing device set. Accordingly, the second shearing step sequentially takes place after the first shearing step is completed. This continuous process may be accomplished by using, in the second shearing step, a part of the pressing module used in the first shearing step.

Figure 1:
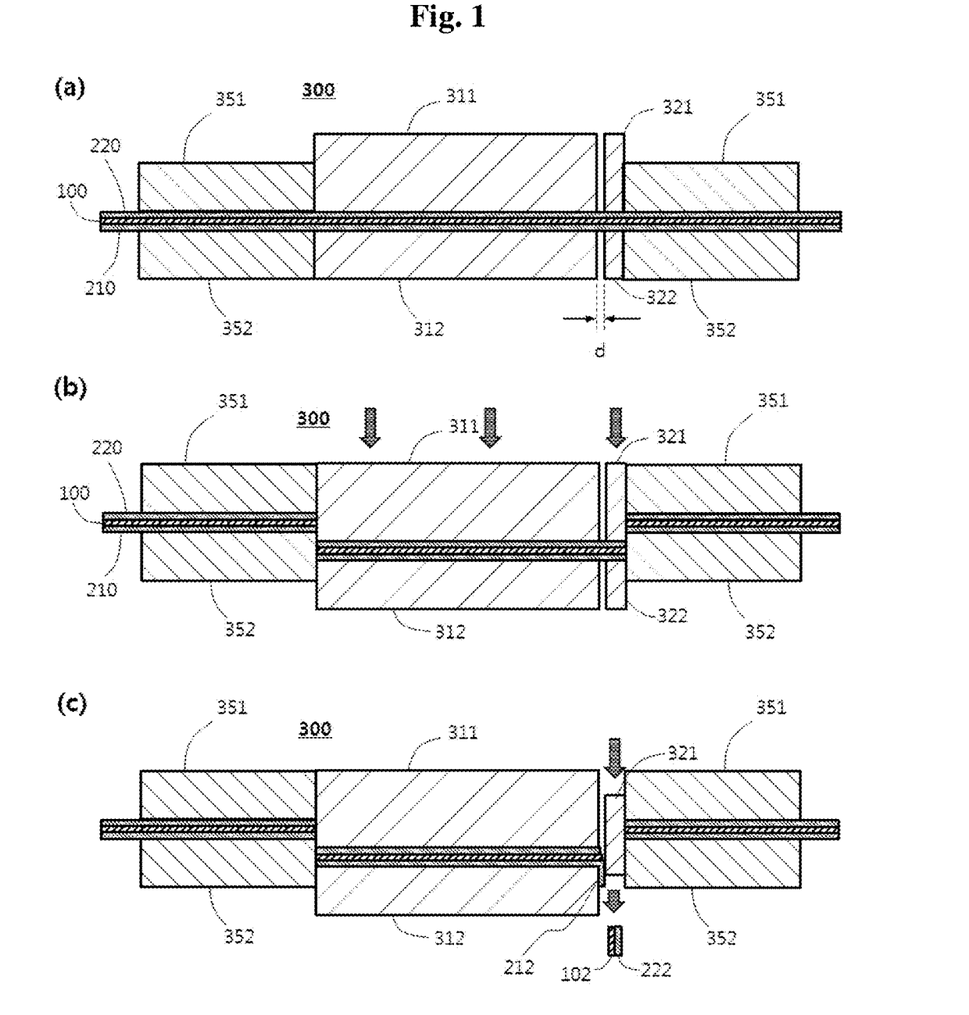

An example of the manufacturing process by using a combined-type shearing device set is illustrated in FIG. 1. For an illustrative purpose, in FIG. 1, a first protection sheet and a second protection sheet are disposed on both sides of a base sheet.

With reference to FIG. 1(*a*), a laminated sheet comprising a base sheet 100 and a first protection sheet 210 (and, optionally, a second protection sheet 220), which is(are) disposed on the base sheet, is placed in a combined-type shearing device set 300.

The combined-type shearing device 300 may have a pressing module having a desired shape with a protruding section at its side edge. The pressing module having a desired shape with a protruding section at its side edge may comprise a first pressing module 311 that has a shape conforming to the body of the laminated sheet and a second pressing module 321 that has a shape conforming to the protruding section. The first and the second pressing modules 311, 321 may adjoin each other with a clearance. The clearance d between the first and the second pressing modules 311, 321 may be greater than one half of the thickness of the first protection sheet 210 and smaller than the sum of the thicknesses of the protection sheet 210 and of the base sheet 100.

Further, a supporting module may be provided on the side opposite to the pressed side of the laminated sheet. The supporting module may comprise a first supporting module 312 and a second supporting module 322. The first supporting module 312 has the same shape as that of the first pressing module 311 and supports the body of the laminated sheet before and during the first shearing step. The second supporting module 322 has the same shape as that of the second pressing module 321 and supports the protruding section of the laminated sheet before and during the first shearing step.

The portions of the laminated sheet that are not in contact with the first and the second pressing modules 311, 321 and the first and the second supporting modules 312, 322 are fixed by upper and lower dies 351, 352.

With reference to FIG. 1(*b*), the first and the second pressing modules 311, 321 instantaneously move along the direction normal to the surface of the laminated sheet to apply shear forces. The moving distances of the first and second pressing modules 311, 321 are equal to or greater than the thickness of the laminated sheet.

The first and the second pressing modules 311, 321 may be mechanically connected to each other to move simultaneously.

Further, the first and the second supporting modules 312, 322 are mechanically connected to the first and the second pressing modules 311, 321, respectively, to simultaneously, thereby preventing a compressive force from being applied on the laminated sheet during the first shearing step.

With reference to FIG. 1(*c*), after the first shearing step is completed, the second shearing step may be conducted by moving only the second pressing module 321 along the direction normal to the surface of the laminated sheet while the first pressing module 311 is at rest. The moving distance of the second pressing module is greater than the thickness of the laminated sheet.

The first supporting module 312 continues to support the body of the laminated sheet during and after the second shearing step. The second supporting module 322, however, plays a role as a support for the protruding section of the laminated sheet until the beginning of the second shearing step. As the second shearing step begins, the second supporting module 322 is lowered or removed, thereby allowing easy removal of the protruding section of the base sheet 102 (and, optionally, the protruding section of the second protection sheet 222) that is(are) cut as a result of the second shearing step.

According to the process explained above, the cut-out laminated sheet may be prepared in an efficient manner by a continuous two-step shearing process.

Example

Preparation of Cut-Out Laminated Sheet by Using a Separate-Type Shearing Device Set The first and the second shearing steps may be conducted in separate shearing device sets. In other words, the first shearing step takes place in a first set of shearing dies, and then the cut-out laminated sheet thus obtained is transferred to a second set of shearing dies wherein the second shearing step is carried out.

Figure 2:
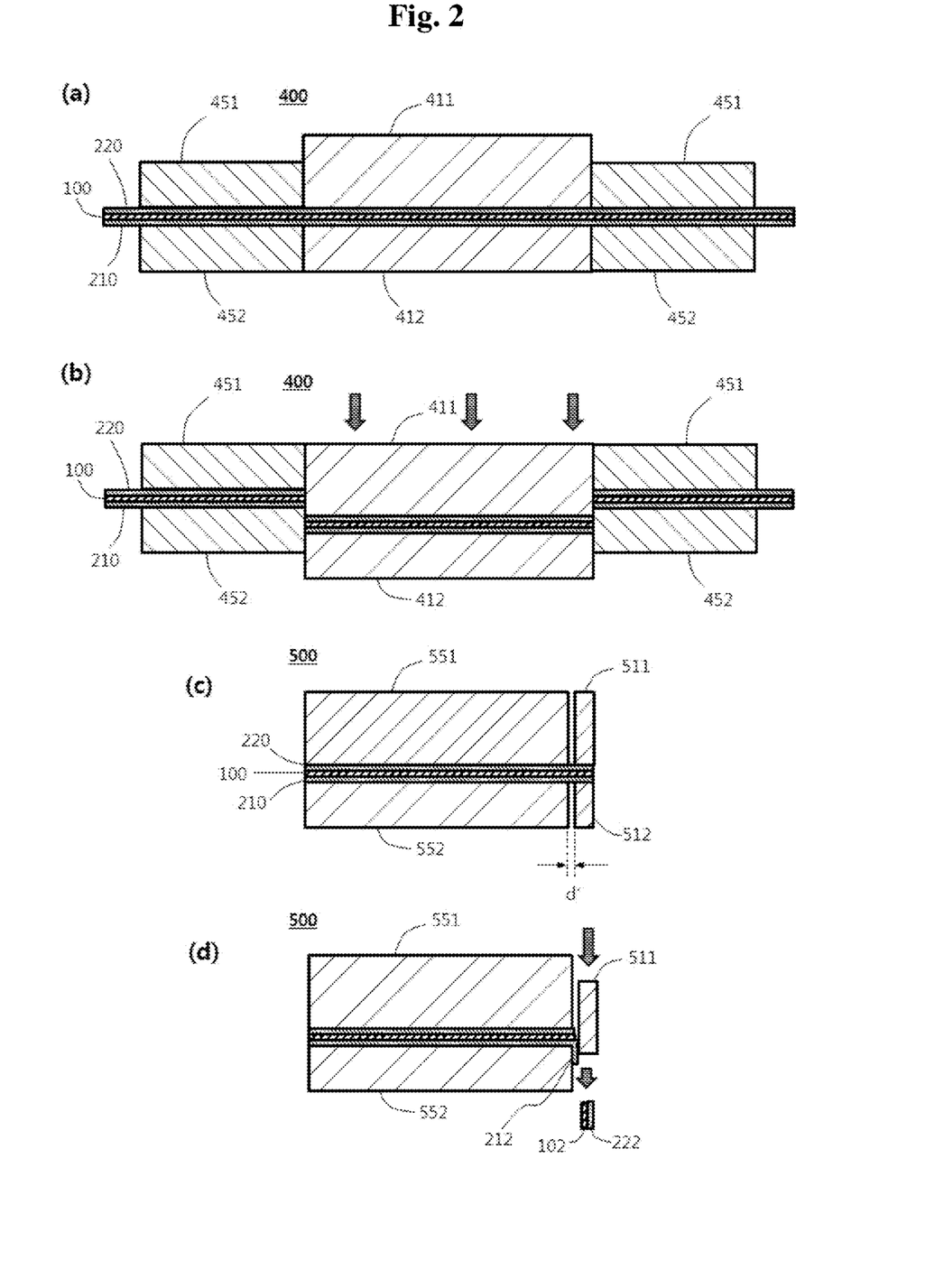

An example of the manufacturing process by using a separate-type shearing device set is shown in FIG. 2. For an illustrative purpose, in FIG. 2, a first protection sheet and a second protection sheet are disposed on both sides of a base sheet.

With reference to FIG. 2(a), a laminated sheet comprising a base sheet 100 and a first protection sheet 210 (and, optionally, a second protection sheet 220), which is(are) disposed on the base sheet, is placed in a first shearing device set 400.

The first shearing device set 400 may have a pressing module 411 having a desired shape with a protruding section at its side edge.

Further, a supporting module 412 may be provided on the side opposite to the pressed side of the laminated sheet. The supporting module 412 has the same shape as that of the pressing module 411 and supports the body of the laminated sheet before and during the first shearing step.

The portions of the laminated sheet that are not in contact with the pressing module 411 and the supporting module 412 are fixed by upper and lower dies 451, 452.

With reference to FIG. 2(b), the pressing module 411 instantaneously move along the direction normal to the surface of the laminated sheet to carry out the first shearing step. The moving distance of the pressing module 411 is equal to or greater than the thickness of the laminated sheet.

The supporting module 412 may be mechanically connected to the pressing module 411 in order to prevent a compressive force from being applied on the laminated sheet during the first shearing step.

With reference to FIG. 2(c), the laminated sheet is transferred to a second shearing device set 500 after the first shearing step is completed.

The second shearing device set 500 may have a pressing module 511 having a shape of a protruding section.

Further, a supporting module 512 may be provided on the surface opposite to the pressed side of the laminated sheet. The supporting module 512 has the same shape as that of the pressing module 511 and supports the protruding section of the laminated sheet until the beginning of the second shearing step.

The body of the laminated sheet except the protruding section is fixed by upper and lower dies 551, 552 before and during the second shearing step.

The pressing module 511 and the upper die 551 may be designed to adjoin each other with a clearance. The clearance d' between the pressing module 511 and the upper die 551 may be greater than one half of the thickness of the first protection sheet and smaller than the sum of the thicknesses of the base sheet and the first protection sheet.

With reference to FIG. 2(d), the pressing module 511 instantaneously moves along the direction normal to the surface of the laminated sheet while the body of the laminated sheet is held by the upper and lower dies 551, 552 to carry out the second shearing step. The moving distance of the pressing module 511 is equal to or greater than the thickness of the laminated sheet.

The supporting module 512 no longer supports the protruding section, but is lowered or removed as the second shearing step begins, so that the protruding section of the base sheet 102 (and, optionally, the protruding section of the second protection sheet 222) can be removed easily.

According to the process explained above, the cut-out laminated sheet may be prepared in an efficient manner by two simple shearing processes.

Cut-Out Laminated Sheet

The cut-out laminated sheet of the present invention comprises a base sheet and a first protection sheet, wherein the first protection sheet fully covers one side of the base sheet and has a protruding section at its side edge which extends outwardly beyond the base sheet.

The cut-out laminated sheet may further comprise a second protection sheet disposed on the side of the laminated sheet opposite to the side on which the first protection sheet is disposed, wherein all the side edges of the second protection sheet conform to their corresponding side edges of the base sheet.

Hereinafter, for an illustrative purpose, the cut-out laminated sheet comprising a first and a second protection sheets is explained with reference to FIG. 3 (b).

The cut-out laminated sheet 10 has the first protection sheet 210 disposed on one side and the second protection sheet 220 disposed on the opposite side of the base sheet 100. In the cut-out laminated sheet, the second protection sheet 220 has the same shape and size as those of the base sheet 100; as such, all of its side edges conform to their corresponding edges of the base sheet. However, the first protection sheet has a protruding section 212 at its side edge, which slightly extends outwardly beyond the base sheet 100 and the second protection sheet 220.

The base sheet 100 and the second protection sheet 220, which do not have the protruding section, may be flat with a shape of, e.g., a rectangle, a square, a circle, an ellipse, and the like.

Further, the first protection sheet 210 is comprised of the protruding section 212 and the body 211. The shape of the body 211 may be flat with a shape identical to the shape of the base sheet 100 and the second protection sheet 220; and the protruding section 212 may be flat with a shape of, e.g., a rectangle a square, a circle, an ellipse, and the like, which extends from the edge of the body. Also, there may be a fold mark at the interface between the body and the protruding section 15.

In the case where the laminated sheet comprises a first and a second protection sheets, the base sheet may consist of a plurality of base sheet pieces. In other words, the base sheet may be laminated inbetween the first and the second protection sheets as it is divided into a plurality of pieces or has a plurality of cracks therein.

The entire first protection sheet 210 can be easily removed from the cut-out laminated sheet 10 by holding the protruding section 212 thereof to peeling it off.

Accordingly, the cut-out laminated sheet can be effectively used in applications of such various sheets as brittle sheets and flexible sheets.

Particularly, the inventive method can be used to prepare a magnet sheet for securing an appropriate communication distance and reliability by suppressing an eddy current generated from a metal/conductive plate adjacent to an antenna and jamming radio waves caused thereby in near field communication (NFC).

Cut-Out Sheet

The present invention also provides a cut-out sheet obtained by removing the first protection sheet (and, optionally, the second protection sheet) from the cut-out laminated sheet.

Figure 4:
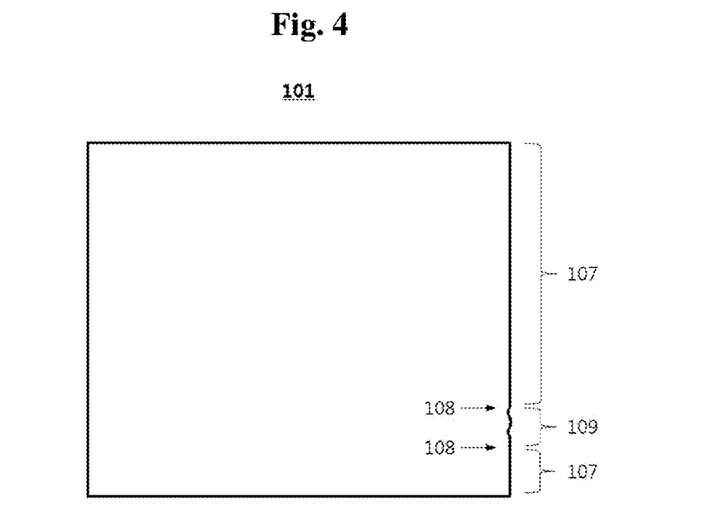
FIG. 4 illustrates a plain view of a base sheet (cut-out sheet) after the second shearing step according to the present invention.
Figure 5:
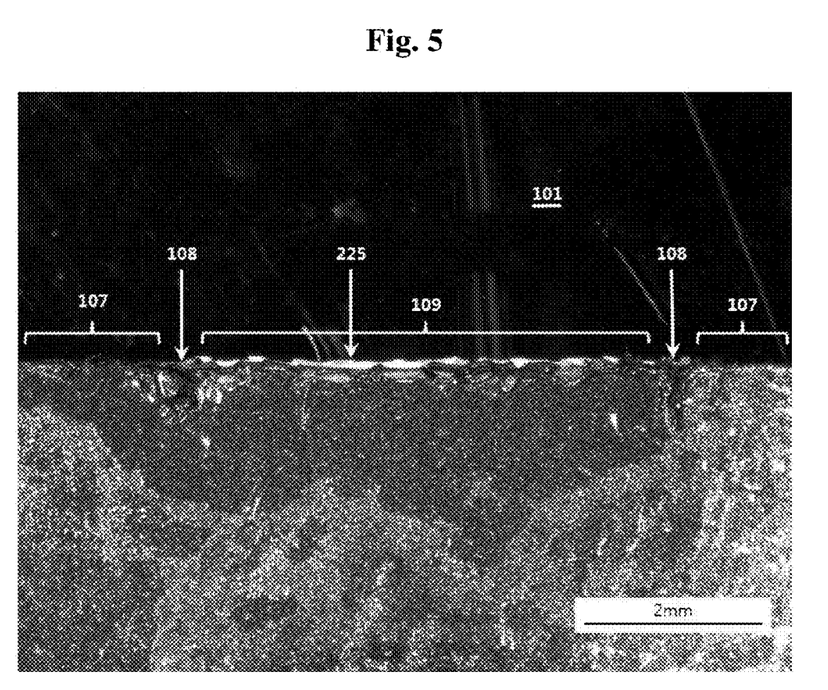
FIG. 5 is a scanning electron microscope (SEM) photograph showing the cut edges of a base sheet body (cut-out sheet) where a protruding section has been cut during the second shearing step according to the present invention.

With reference to FIGS. 4 and 5, the cut-out sheet 101 has cut edges as a result of the first and the second shearing steps, more specifically, a first cut edge 107 as a result of the first shearing step and a second cut edge 109 as a result of the second shearing step.

The first and the second cut edges may not exist together at the same edge of the sheet; in other words, they may each exist at different edges.

Otherwise, the cut-out sheet may have both the first and second cut edges at, at least, one of its side edges. That is, as shown in FIG. 4, the first and the second cut edges 107, 109 may exist together at the same edge of the cut-out sheet 101.

In this case, cracks may be found at the border 108 between the first and the second cut edges. The second cut edge 109 may be protruded or retracted as compared with the first cut edge 107. Also, the roughness of the first cut edge 107 is different from that of the second cut edge 109. Moreover, fragments (debris) of the protection sheet (especially, the second protection sheet) generated during the second shearing step may be left at, at least, part of the second cut edge 109. The cut-out sheet 101 may be a metal sheet or a ceramic sheet having a magnetic property.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a cut-out laminated sheet, comprising the steps of:
    (a) preparing a laminated sheet comprising a base sheet and a first protection sheet disposed on one side of the base sheet;
    (b) subjecting the laminated sheet of step (a) to a first shearing step to obtain a first cut-out laminated sheet of a desired shape, wherein the first shearing step being carried out using a pressing module having the desired shape, wherein the first cut-out laminated sheet further has a protrusion at its side edge, and
    wherein the first cut-out laminated sheet comprises a first part consisting of the desired shape and a second part consisting of the protrusion, said first part and second part both comprise the base sheet and the first protection sheet; and
    (c) subjecting the first cut-out laminated sheet obtained in step (b) to a second shearing step to remove the base sheet from the second part of the first cut-out laminated sheet, giving a second cut-out laminated sheet of the desired shape,
    wherein the second part of the second cut-out laminate comprises the first protection sheet without the base sheet.

2. The method of claim 1, wherein the pressing module comprises a first part and a second part, separated apart at a distance d, and the first part of the pressing module presses the first part of the first cut-out laminated sheet and the second part of the pressing module presses the second part of the first cut-out laminated sheet;
    and wherein the second shearing step comprises applying shear forces to the first part and the second part of the pressing module in a direction normal to the surface of the first cut-out laminated sheet, said shear force applied to the first part of the pressing module and the shear force applied to the second part of the pressing module acting in opposite directions to each other to cut and remove the base sheet only from the second part of the first cut-out laminated sheet.

3. The method of claim 2, wherein the distance d between the first part of the pressing module and the second part of the pressing module is greater than one half of the thickness of the protection sheet and smaller than the sum of the thicknesses of the protection sheet and of the base sheet.

4. The method of claim 2, wherein the first protection sheet is flexible.

5. The method of claim 1, wherein the first shearing step (b) is conducted by a blanking process which comprises applying shear forces to the laminated sheet obtained in step (a) by using a pressing module having a desired shape with a protruding section at its side edge to give a first cut-out laminated sheet; and the second shearing step (c) is conducted by applying shear forces in the direction normal to the surface of the first cut-out laminated sheet only to the second part of the first cut-out laminated sheet by pressing a pressing module having a shape conforming to the second part of the first-cut out laminated sheet, while the first part of the first cut-out laminated sheet, except the second part of the first cut-out laminated sheet is fixed.

6. The method of claim 5, wherein the first shearing step (b) and the second shearing step (c) are conducted in a single shearing device set;
    the pressing module having a desired shape with a protruding section at its side edge comprises a first pressing module that has a shape conforming to the first part of the first cut-out laminated sheet and a second pressing module that has a shape conforming to the second part of the first cut-out laminated sheet, the first and the second pressing modules adjoining each other with a distance d therebetween;
    the first shearing step (b) is conducted by instantaneously moving the first and the second pressing modules along the direction normal to a surface of the laminated sheet obtained in step (a); and
    the second shearing step is conducted by moving only the second pressing module along the direction normal to the surface of the first cut-out laminated sheet while the first pressing module is at rest.

7. The method of claim 1, wherein a second protection sheet is further disposed on the side of the laminated sheet opposite to the side on which the first protection sheet is disposed in step (a); and the second shearing step (c) removes the second protection sheet from the second part of the first cut-out laminated sheet.

8. The method of claim 7, wherein the first cut-out laminated sheet obtained in step (b) comprises the base sheet, the first protection sheet and the second protection sheet which all have an identical shape and size of the first and the second parts of the first cut-out laminated sheet; and, the second cut-out laminated sheet obtained in step (c) comprises the bases sheet, the first protection sheet and the second protection sheet, only in the first part of the second cut-out laminated sheet, and comprises the first protection sheet alone, in the second part of the second cut-out laminated sheet.

\* \* \* \* \*